Jan. 8, 1946. H. W. BALDWIN 2,392,718
COWL FASTENER
Filed April 15, 1943 2 Sheets-Sheet 1

INVENTOR
HERBERT W. BALDWIN, DECEASED
BY HAZEL W. BALDWIN, ADMINISTRATRIX

BY
PATENT ATTORNEY.

Jan. 8, 1946.     H. W. BALDWIN     2,392,718
COWL FASTENER
Filed April 15, 1943     2 Sheets-Sheet 2

INVENTOR
HERBERT W. BALDWIN,
DECEASED,
BY HAZEL M. BALDWIN,
ADMINISTRATRIX.
BY
James M. Clark
PATENT ATTORNEY Patented Jan. 8, 1946

2,392,718

UNITED STATES PATENT OFFICE 2,392,718

COWL FASTENER

Herbert W. Baldwin, deceased, late of Inglewood, Calif., by Hazel M. Baldwin, administratrix, Glendale, Calif., assignor to North American Aviation, Inc., Inglewood, Calif., a corporation of Delaware Application April 15, 1943, Serial No. 483,214

6 Claims. (Cl. 24—221)

The present invention relates to fastening devices, and more particularly to an improved cowl fastener of a quick detachable type adapted to provide a flush surface for use on aircraft cowling, access covers and similar devices, and to the method of assembling the same.

It is a principal object of the present invention to provide an improved fastening device which is quickly detachable or readily releasable to permit rapid attachment and separation of two plate or sheet elements. It is also an object to provide a fastener of the flat head or flush type which closely and securely maintains the plate elements together in their fastened condition thereby presenting a smooth exterior surface of good aerodynamic qualities. It is a further object to provide a cowl fastener of the present type which is self-contained and its attachment facilitated by the stud being resiliently retained by one of the respective plate elements which it serves to fasten.

It is a further object to provide a positive-acting cowl fastener assembly in which the slotted stud element is resiliently held in the detached position of the fastener in a position from which it is readily pressed into its orifice and locked without unnecessary alignment of the parts to facilitate assembly. It is a still further object to provide a cowl fastener of simple and low cost construction which is comprised of a minimum of simplified parts and may be readily installed.

It is a further object to provide in a flush type readily releasable cowl fastener a collapsible coil spring arrangement by which the stud is retained or prevented from being separated from the outer sheet element and lost or misplaced in its detached position and which further assists in making the fastening secure when assembled by exerting a resilient pressure to maintain the engaging portions of the fastener in a secure and fixed relationship.

Other objects and advantages of the present invention will become apparent to those skilled in the art after a reading of the present specification and the attached drawings forming a part hereof, in which.

Figure 1:
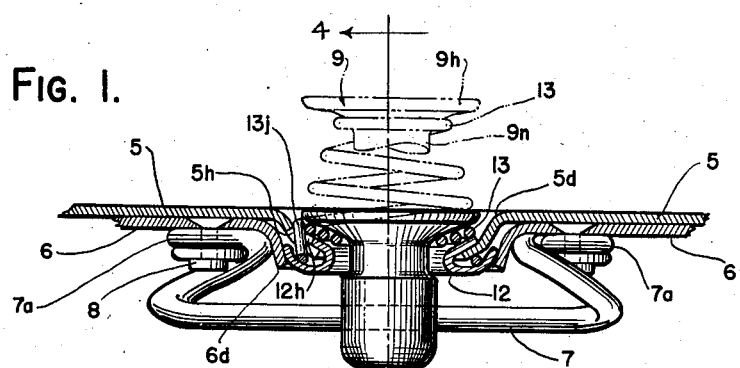
Fig. 1 is a cross-sectional view of a preferred form of the cowl fastener and the attached plate elements in their assembled relationship.

Referring now to Fig. 1, the numeral 5 represents an outer cover sheet or plate element which it is desired be detachably secured in close proximity to a corresponding inner plate element 6. The outer sheet element 5 is punched and suitably countersunk or dimpled as at 5d and a coaxial and corresponding, though somewhat deeper countersunk dimple is provided in the inner sheet at 6d. To the inner sheet 6 there is attached a suitable cross wire spring 7 of a well known form and type, having coiled ends 7a by which it is fastened to the sheet element 6 by means of the countersunk head rivets 8. A stud element 9, of a generally known type is mounted for co-axial movement toward and rotation within the aligned dimpled orifices 5d and 6d of the outer and inner plate elements respectively. The stud or button 9 is comprised of a head portion 9h provided with a conical abutting face 9b, a flat top surface 9a and a tubular shank portion which is spirally slotted as at 9s to engage the cross wire 7. The latter is supported from the inner plate 6 in such manner that it is disposed diametrically across the circular opening of the dimpled holes and the path of the stud end as it is inserted axially toward its engaged position. The spiral slots 9s are usually two in number, being diametrically opposed and are provided with a slightly enlarged detent portion 9t in which the rod element 7 is resiliently retained, by virtue of the resilient nature of its mounting by the rivets 8. The shank of the stud 9 is provided with a recessed neck portion 9n between the flat head 9h and the remainder of the shank.

Figure 2:
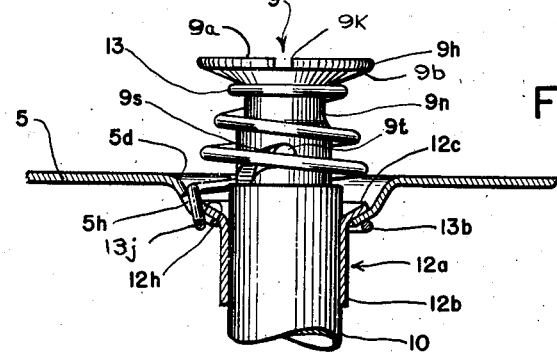
Fig. 2 is a partial cross-sectional view of an early stage of the assembly of the fastener stud to the outer sheet.

The construction of the fastening device as described to this point is of a conventional and well known type and in itself does not form a novel part of the present invention except insofar as the novel structure to be described below is attached to, and cooperates with the foregoing structure. Referring now to Fig. 2, there is shown an early stage in the assembly of the novel resilient retaining structure for the studs of this invention. The outer sheet element 5 is dimpled at 5d to an angle and a depth to accommodate the intervening spring 13 such that the head 9h of the stud 9 in its assembled position will lie perfectly flush with the upper or outer surface of the sheet 5. The spring 13, of appreciably lighter wire stock than the lower stud retaining spring 7, is of a conical and helical form having a single turn at its base portion which is free of any pitch or spiral form and is provided intermediate the flat base and the conical portion with a substantially vertical joggled or offset portion at 13j. The spring 13 may be of any suitable material of the proper resilience and other qualities, and music wire, suitably heat treated and cadmium plated, has given satisfactory results when used on aircraft cowling and similar components.

In forming the dimpled portion 5d in the stud-carrying sheet 5 after the central orifice has been punched and the dimple formed, a small peripheral notch or hole 5h is cut preferably such that it is open to the larger central hole. A grommet blank 12a, formed of tubular stock having a cylindrical body 12b, and an outwardly flared or flanged conic portion 12c is inserted from the outer face of the sheet element 5. The flanged portion 12c of the blank 12a is also provided with a peripheral notch or hole at 12h, the blank being inserted so that it is supported by the dimpled portion 5d of the outer sheet and the hole 12h made to coincide with the corresponding hole 5h in the edge of the dimpled portion. The end of the lower, or base turn 13b of the spring is then inserted within the aligned slots or holes 5h and 12h and the spring 13 is rotated until the joggled portion 13j is disposed within the aligned holes, as shown in Fig. 2.

Continuing to refer to Fig. 2, a special tubular sleeve tool 10 is then inserted within the tubular body 12b of the grommet from below to a position where it extends up inside to the beginning of the conic portion of the spring. The button or stud 9 is then inserted into the upper or apex turn of the spring with the lower shank portion of the stud slidably guided and supported by the sleeve 10. When the upper turn of the spring 13 has snapped into and resiliently engaged the undercut or neck portion 9n of the stud, the latter is thereafter rotatably and resiliently retained by the spring 13, and the sleeve tool 10 may then be withdrawn.

Figure 3:
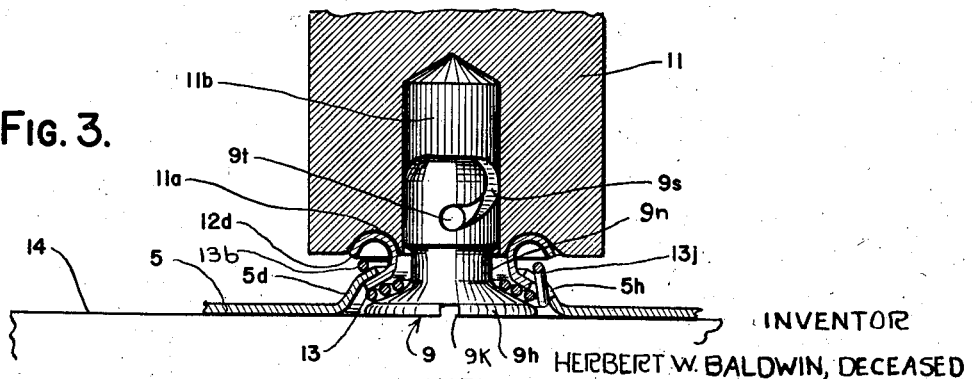
Fig. 3 is a sectional elevation of the partial assembly of Fig. 2 in an inverted position with the grommet upsetting tool in its working position.
Figure 6:
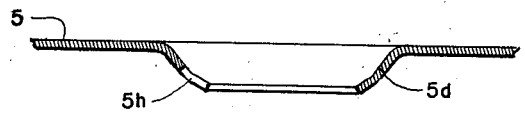
Fig. 6 is a cross-sectional view of the same as taken along the lines 6—6 of Fig. 5.
Figure 5:
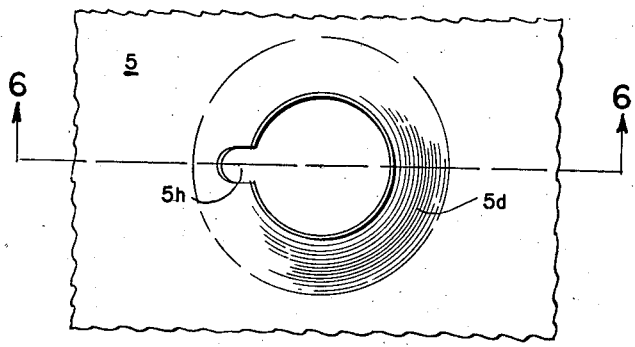
Fig. 5 is a bottom plan view of a dimpled hole in the sheet from which the stud is resiliently carried.
Figure 4:
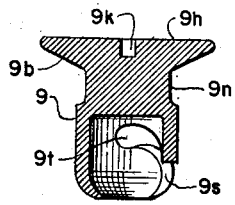
Fig. 4 is a cross-sectional view of the stud as taken along the lines 4—4 of Fig. 1.
Figure 8:
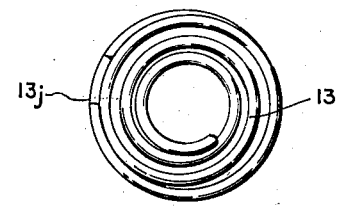
Fig. 8 is a plan view of the same.
Figures 7, 9, 11:
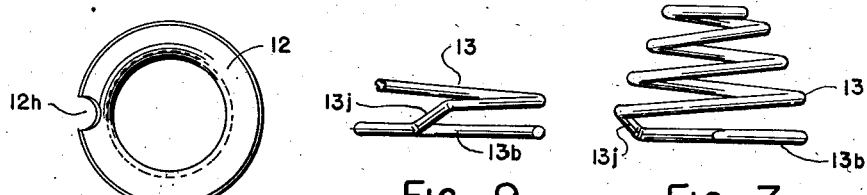
Fig. 7 is a side elevational view of the resilient retaining spring.
Fig. 9 is a further side elevational view of the said spring showing its offset portion.
Fig. 11 is a top plan view of the same.
Figure 10:
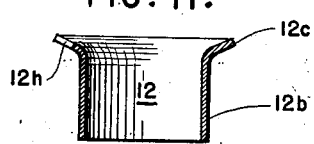
Fig. 10 is a cross-sectional elevation of the blank for the grommet by which the spring is retained upon the outer sheet element.

Referring now to Fig. 3 the assembly previously described and shown in Fig. 2 is preferably inverted and supported upon a flat supporting surface 14, as shown in Fig. 3. As the sheet 5 is pressed against the surface 14 the head 9h of the stud is forced upwardly into the dimpled orifice, compressing the conic portion of the spiral spring 13 until the head portion becomes flush with the surface of the sheet 5. The insertion of the stud 9 into the dimpled recess in the sheet 5 has the effect of reversing the direction of the conic outline defined by the spring 13 as may be more clearly seen by comparing the dotted outline with the solid line cross-section of the spring as shown in Fig. 1. A grommet driving or spreading tool 11, having a recessed forming portion at 11a and a central bore 11b of a diameter to closely engage the stud shank, is then forced downwardly, spreading the original tubular portion 12b of the grommet blank, indicated by the intermediate form as 12d, outwardly and downwardly so that it clinches both the dimpled flange 5d and the bottom coil 13b of the spring 13, retaining the latter in a fixed relationship with respect to the dimpled portion of the sheet and the clinched grommet.

On completion of the downward stroke of the grommet spreading tool 11 and its removal from the shank of the stud 9 the upper or outer sheet 5 and its attachment assembly is ready for its connection to the lower sheet 6 and its corresponding attachment cross bar 7 as shown in Fig. 1. As the sheets 5 and 6 are brought together the stud 9 will be held by its neck 9n in the dotted line position indicated at the top of Fig. 1 by the upper coil of the conic spring 13. It will be noted from this figure that the diameter of the opening formed by the inner edge of the completed grommet 12 is somewhat greater than the largest outside diameter of the shank portion of the stud 9. In prior fasteners of this general type where grommets have been used they usually serve the sole function of engaging the neck portion of the stud and retaining the latter within the upper sheet in its inner or flush position. In this prior type fastener it is necessary that the stud be rotated, usually by means of a screw driver or similar tool inserted in a slot or kerf provided in the head 9h, prior to, or simultaneously as the upper sheet is brought into contact with the lower sheet in order that the stud slot 9s be aligned with and engage the cross rod 7.

The fastening device shown and described herein improves over such prior devices in the provision of the spring 13 which both retains the stud such that it is not readily removed from the plate 5 or becomes lost, but also resiliently holds the stud in the upper dotted line position in Fig. 1. This permits the two plates, which might be provided with a plurality of individual fasteners of the present type, to be brought into their closely contacting position without interference of the stud ends with the cross rods, and held there while each stud alone is both depressed against the compression of the spring 13 and rotated into its locking position with the cross wire 7. The use of the spring 13 is also advantageous in the engaged position of the fastener in that, being considerably compressed, it tends to push the stud 9 upwardly as viewed in Fig. 1, thereby considerably augmenting the tension imparted in the terminal portion 9t of the slot in the stud to thereby prevent the accidental opening of the fastening device under conditions of severe vibration.

In the assembled relationship of the cowl fastener as shown in the cross section in Fig. 1, it will be noted that the conic portion of the spring 13 is depressed such that the coils of this conic portion are disposed in a side-by-side relationship forming a close conic coil of reversed direction, (see Fig. 1) closely spaced between the lower sloping face of the stud head 9h and the upper conic portion 12c of the grommet 12. The substantially vertical joggled portion of the spring at 13j is thus disposed at the outer periphery of this reversed conic form of the spring 13 such that its upper end is slightly beyond the periphery of the head 9h of the stud. The disengagement of the plate elements 5 and 6 and their associated attachment elements 9 and 7 are also considerably facilitated by the spring 13 which immediately ejects the stud 9 from its position within the aligned openings in the plate elements permitting the sheet 5 to be lifted without the frequent necessity of going back over several of the studs which may have rotated slightly from their unlocked position due to jarring or vibration of the assembly during the period in which the remainder of the fastenings in the assembly are rotated and unlocked. By the use of the disclosed resilient retention structure for the stud, the accidental reengagement of the stud with the lower sheet locking element 7 is prevented and no time is lost going back over a number of studs to determine which stud may still be engaged. Those which have been detached are clearly visible to the operator and there is no tendency to deflect or force the upper sheet separate from the lower to bind or distort the same. It has been found in actual service that the retraction of the unlatched stud by the conical spring has greatly facilitated the installation and removal of cowlings and covers particularly where they are of curved or irregular shapes.

Other modifications and advantages of the present invention both with respect to its general arrangement and the detailed features of its respective elements which may become apparent to those skilled in the art after a reading of the foregoing specification are each intended to be embraced within the scope and spirit of this invention as more particularly defined in the appended claims.

What is claimed is:

1. The combination with a cowl fastener having a spirally-slotted rotatable-stud, of a dimpled stud-carrying sheet, resilient means fastened in non-rotatable relationship to said sheet at one extremity and in surrounding engagement with said stud at the other for rotatably supporting said stud in a position remote from its engaged position, and a grommet engaging said dimpled sheet and a loop portion of said resilient means for its attachment to said sheet, whereby said resilient means is compressed as said stud is moved into its fastening position.

2. In a cowl fastener including a rotatable stud having a spiral slot, an outer sheet element having a countersunk dimpled opening adapted to receive the head of said stud in a flush relationship, a spirally wound coil spring having its base portion attached to said dimpled portion through an offset portion thereof extending through a slot in the periphery of said dimpled portion and means to fasten said offset portion to the underside of said outer sheet element, the opposed portion of said spring rotatably carrying said stud in the region of its countersunk head portion in a plane displaced from said outer sheet in the normal extended position of said spring.

3. The combination with a cowl fastener of the spirally slotted, rotatable stud type wherein the stud is formed with an annular groove adjacent its head, of a first sheet having a dimpled orifice, a second sheet having a dimpled orifice co-axially disposed therewith, a conically wound coil spring having its base portion attached to the first said sheet and its apex portion formed as a loop in surrounding engagement in the groove of said stud whereby the stud is normally supported in a position displaced from said first sheet, resilient means carried by said second sheet engageable by the spirally slotted portion of said stud, the said coil spring and resilient means acting upon the stud in opposite directions to increase and maintain the close contact of said sheet and the organization of said dimpled orifices, coil spring and stud being such that with the stud engaging the said resilient means, the coils of the conic spring will be disposed in side-by-side relation to form a close conic coil of reverse direction.

4. In a cowl fastener of the rotatable-stud type having a spiral slot, an outer sheet element having a countersunk dimpled opening adapted to receive the head of said stud in a flush relationship, the edge of said dimpled opening having a notch cut therein, a flanged grommet having a coinciding notch co-axially disposed within said dimpled opening, a spirally-wound coil spring having one of its coils passing through said coinciding notches, a terminal portion of said coil extending beyond said notches, and being secured between said grommet and the dimpled portion of said outer sheet, and the opposite terminal portion of said coil spring rotatably carrying said stud by surrounding engagement therewith and at a position substantially removed from said opening in the normal extended position of said coil spring.

5. The combination with a cowl fastener of the rotatable stud type in which the stud shank is formed with an annular groove adjacent the head, of a stud-carrying sheet having a dimpled hole, resilient means fastened to said sheet and having a loop portion closely engaging the annular groove for normally supporting said stud in a position displaced from contact with the said sheet whereby the stud is attached to the sheet but is relatively movable with respect thereto and annular means clinchingly engaging both the edges of said dimpled hole and a further loop portion of said resilient means for its attachment to said sheet.

6. In a cowl fastener of the rotatable stud type in which the stud shank is formed with an annular groove adjacent the head; a stud-carrying sheet element having a countersunk dimpled opening adapted to receive the head of said stud in a flush relationship; the edge of said dimpled opening having a notch cut therein; a flanged grommet, having a coinciding opening corresponding to said notch, co-axially disposed within said dimpled opening; a spirally wound coil spring having one of its coils passing through said coinciding notch and opening; a terminal portion of said coil extending beyond the notch being fastened between said grommet and the dimpled portion of the sheet element; the opposite terminal portion of said spring being formed as a loop in close engagement with the annular groove for normally supporting the stud displaced from contact with the said sheet element but in attachment thereto.

HAZEL M. BALDWIN,
*Administratrix of the Estate of Herbert W. Baldwin, Deceased.*